United States Patent [19]

Miura

[11] 4,173,789
[45] Nov. 6, 1979

[54] MULTIPLICATION CONTROL SYSTEM

[75] Inventor: Haruhisa Miura, Hino, Japan

[73] Assignee: Tokyo Shibaura Electric Co., Ltd., Japan

[21] Appl. No.: 865,211

[22] Filed: Dec. 28, 1977

[30] Foreign Application Priority Data

Dec. 23, 1976 [JP] Japan ................................. 51-154177

[51] Int. Cl.² ............................................. G06F 7/52
[52] U.S. Cl. .................................................. 364/760
[58] Field of Search ........................................ 364/760

[56] References Cited

U.S. PATENT DOCUMENTS

| | | | |
|---|---|---|---|
| 3,192,363 | 6/1965 | MacSorley | 364/760 |
| 3,366,780 | 1/1968 | Lee et al. | 364/760 |
| 3,730,425 | 5/1973 | Kindell et al. | 364/760 |

*Primary Examiner*—Jerry Smith
*Attorney, Agent, or Firm*—Finnegan, Henderson, Farabow & Garrett

[57] ABSTRACT

A multiplication control system comprising a multiplying circuit to which a binary-coded multiplier and a binary-coded multiplicand are supplied, a leading 0/1 decoder which detects the number of significant digits in the binary-coded multiplier, a divider which divides the detected decoder output by a predetermined number, a selector into which an external constant is entered, a recursive control counter to which an output of the selector is supplied, an arithmetic unit which calculates the difference of outputs from said divider and said counter, a zero detector which detects the content "zero" of said recursive control counter, a shift circuit to which a product of said multiplying circuit controlled by the zero detector output is transmitted, and a multiplier which multiplies the output of said divider by a predetermined number and supplies the result to said shifter.

11 Claims, 5 Drawing Figures

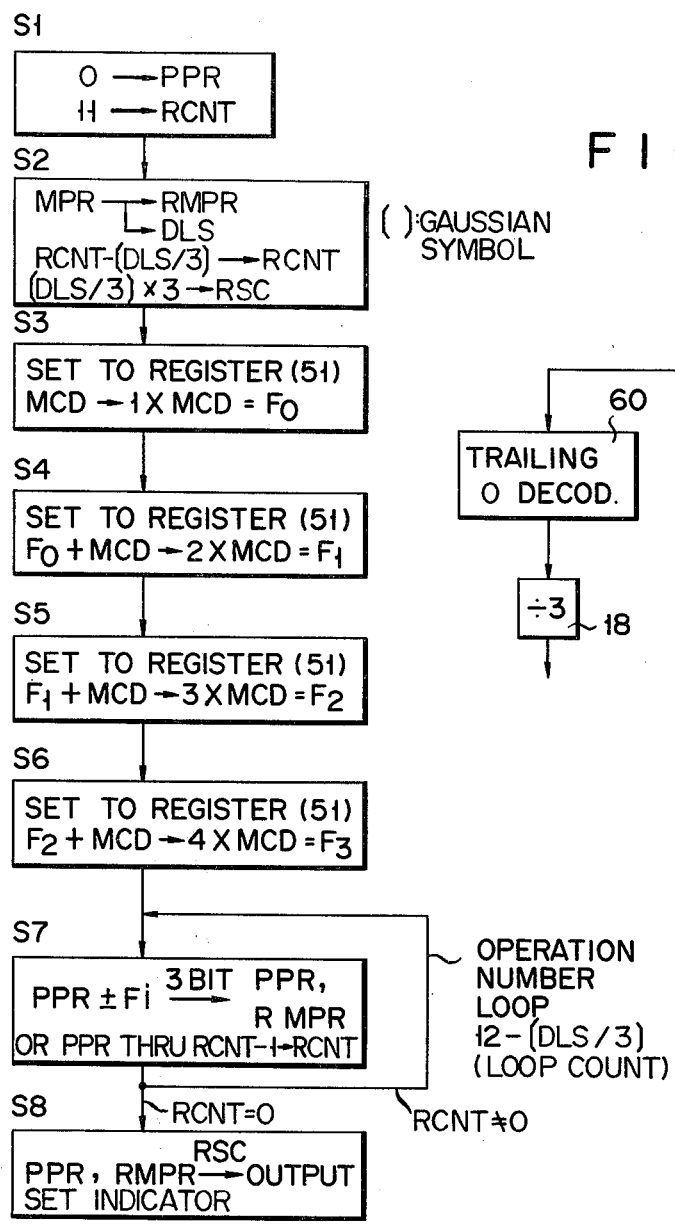
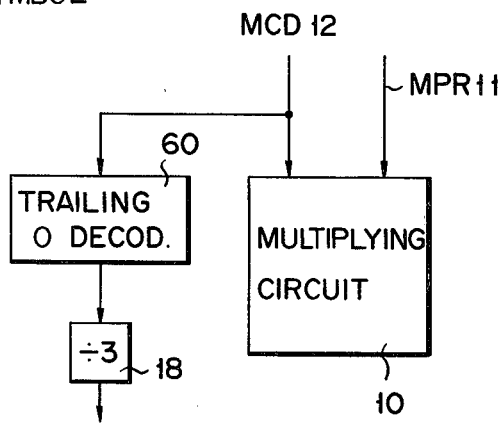

MULTIPLICATION CONTROL SYSTEM

BACKGROUND OF THE INVENTION

This invention relates to a multiplication control system for multiplying a binary-coded multiplier and a binary-coded multiplicand.

The multiplication between binary-coded numbers is carried out by repeating an "add" operation a plurality of times, and the number of bits of the resultant product becomes larger than the numbers of bits of the multiplier and the multiplicand. In general, therefore, a "multiply" instruction requires an instruction executing period of time which is several times longer than that of an "add" or "subtract" instruction. At present, increasing use is being made of "multiply" instructions, not only in electronic computers for science, but also in electronic computers for business, and a variety of inconveniences have occurred due to the long time required for executing binary multiplication operations. Although various multiplication systems have heretofore been proposed, any of them has the disadvantage that the processing time is long. By way of example, a method of multiplication is known wherein the multiplier is processed a bit at a time. If the bit is "1," it is added to a multiplicand, while if the bit is "0," nothing is added. The resultant bit and the multiplier are shifted one digit. This operation is sequentially repeated for the respective bits. According to such a multiplication system, all the bits of the multiplier and the multiplicand must be sequentially processed in this manner. Therefore, the processing time remains fixed whatever the contents of the multiplier and the multiplicand may be. Disadvantageously, even when the number of significant bits is small, a long time for multiplication is required.

SUMMARY OF THE INVENTION

It is accordingly an object of this invention to provide a multiplication control system in which the multiply operation is executed for only significant bits of either a multiplier or a multiplicand, whereby the processing time is shortened. In accordance with the invention there is provided a multiplication control system wherein the number of digits in the digits of the multiplier or multiplicand which require operations is detected, the number of recursive or repetitive multiplication operations of a multiplying circuit is determined on the basis of the detected number of digits and a predetermined constant, and the "multiply" operations are executed in the multiplying circuit in accordance with the number of recursive operations required.

BRIEF DESCRIPTION OF THE DRAWINGS

FIG. 4 is a flow chart for explaining the operation of the circuits shown in FIG. 1 and FIG. 3; and FIG. 5 is a block diagram showing another example of a circuit for detecting the number of significant digits in an operand processed in the circuit of FIG. 1.

DETAILED DESCRIPTION OF THE PREFERRED EMBODIMENTS

In an embodiment to be described hereunder, a multiplication system is provided in which the n-bit check system, n being 3, is employed. Assuming that both a multiplier (MPR) and a multiplicand (MCD) are 36-bit signed binary numbers represented respectively as follows:

$$\text{Multiplier (MPR)} = -b_0 \times 2^{35} + \sum_{i=1}^{35} b_i \times 2^{35-i} \quad (b_i = 0 \text{ or } 1) \quad (1)$$
$$= -b_0 \times 2^{35} + b_1 \times 2^{34} + b_2 \times 2^{33} + b_3 \times 2^{32} + b_4 \times 2^{31} +$$
$$\ldots + b_{35} \times 2^0$$
(By adding $b_3 \times 2^{32} - b_3 \times 2^{32} = 0$ and $b_{36} = 0$ to the above:
$MPR = -b_0 \times 2^{35} + b_1 \times 2^{34} + b_2 \times 2^{33} + b_3 \times 2^{32} \times 2$
$-b_3 \times 2^{32} + b_4 \times 2^{31} + \ldots + b_{33} \times 2^2 \times 2 - b_{33} \times 2^2$
$+ b_{34} \times 2^1 + b_{35} + b_{36}$
(Here, $-b_0 \times 2^{35} = b_0 \times 4 \times 2^{33}$, $b_1 \times 2^{34} = b_1 \times 2 \times 2^{33}$
and $b_3 \times 2^{32} \times 2 = b_3 \times 2^{33}$, so that:
$MPR = -b_0 \times 4 \times 2^{33} + b_1 \times 2 \times 2^{33} + b_2 \times 2^{33} + b_3 \times 2^{33}$ $-b_3 \times 2^{33} + b_4 \times 2^{31} + \ldots + b_{33} \times 2^3 - b_{33} \times 4$
$+ b_{34} \times 2 + b_{35} + b_{36}$
$= 2^{33}(-4b_0 + 2b_1 + b_2 + b_3) + 2^{30}(-4b_3 + \ldots)$
$+ \ldots + 2^0(-4b_{33} + 2b_{34} + b_{35} + b_{36})$ Expressed as a general formula, $$MPR = \sum_{i=0}^{11} 2^{33-3i}(-4b_{3i} + 2b_{3i+1} + b_{3i+2} + b_{3i+3})$$

As apparent from the above equation, there are twelve addition terms, and the highest order term is $2^{33}$. Therefore, the multiplication result or product to be evaluated is obtained by repeating the operations in the parentheses of the respective addition terms and the operations of shifting the operated results to 3-bit higher digits (equivalent to multiplying by $2^3$) twelve times.

Likewise, $$\text{Multiplicand (MCD)} = -a_0 \times 2^{35} + \sum_{i=1}^{35} a_i \times 2^{35-i}$$
$$(a_i = 0 \text{ or } 1)$$

Accordingly, the range of binary data in which both the multiplier (MPR) and the multiplicant (MCD) can be expressed becomes as follows:

$$-2^{35} \geq MCD, MPR \geq 2^{35} - 1$$

Further, the range of values of the product (PRD)=MPR×MDC is:

$$-2^{70} < -2^{35}(2^{35}-1) \geq PRD \geq 2^{70}$$

Therefore, a PRD of 72 bits results from the multiplication of two 36 bit terms.

Figure 1:
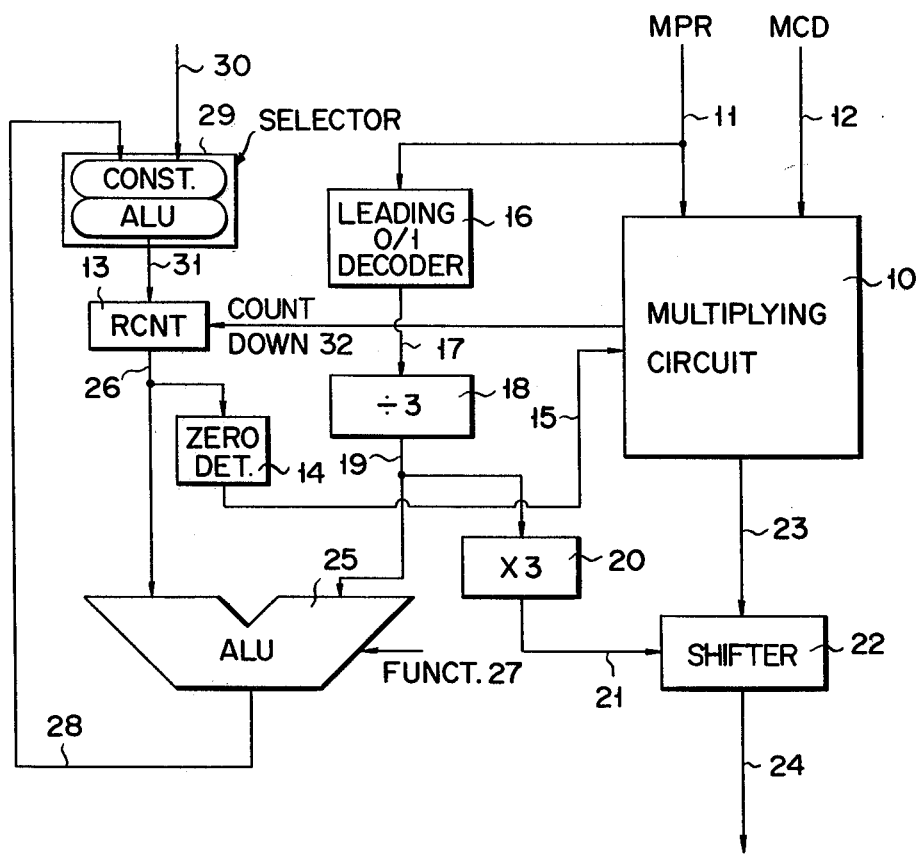
FIG. 1 is a block diagram showing the arrangement of multiplication control apparatus according to one embodiment of the invention.

Referring now to FIG. 1, a multiplying circuit 10 receives an MPR 11 and an MCD 12. The multiplying circuit 10 repeatedly executes the respective operations of the twelve addition terms and the 3-bit shiftings until it is stopped by an output signal 15 from a zero detector 14 which detects that the content of a recursive or repetitive control counter 13 is zero. The number of iterations of the operations and the shiftings is determined from the number of significant bits in all the bits of the MPR 11 or the MCD 12. In the example of FIG. 1, the MPR 11 is used to determine the number of iterations. More specifically, the MPR 11 is supplied to a leading 0/1 decoder 16. The leading 0/1 decoder 16 provides as a decoded leading signal DLS 17 the number of bits in MPR 11 immediately following bit $b_0$ which have the same value as the sign bit $b_0$.

The leading 0/1 decoder 16 has a circuit arrangement which carries out the decoding functions indicated in Table 1.

Table 1

| MPR DATA SIGN: POSITIVE | | MPR DATA SIGN: NEGATIVE (X=0, 1 don't care) | |
|---|---|---|---|
| (0) DATA (35) | OUTPUT | (0) DATA (35) | OUTPUT |
| 01X.........X | 0 | 10X.........X | 0 |
| 001X........X | 1 | 110X........X | 1 |
| 0001X.......X | 2 | 1110X.......X | 2 |
| 00001X......X | 3 | 11110X......X | 3 |
| 000001X.....X | 4 | 111110X.....X | 4 |
| . | . | . | . |
| . | . | . | . |
| . | . | . | . |
| 00.........01 | 34 | 1..........10 | 34 |
| 00..........0 | 35 | 1...........1 | 35 |

That is, the decoder circuit provides an output indicating the number of consecutive bits immediately to the right of the sign bit which have the same value as the sign bit. Since such a decoder circuit can be readily realized by combining gate circuits, it need not be explained in further detail for the purposes of this description.

Figure 2:
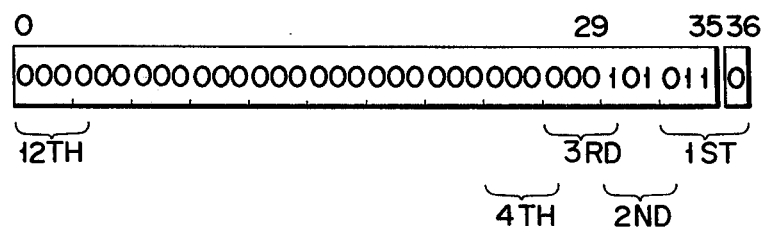
FIG. 2 is a diagram showing an example of the bit construction of a multiplier.

In the specific example of the bit construction of an MPR shown in FIG. 2, twenty-nine bits from bit 1 to bit 29 have the same value ("0") as the sign bit 0. Accordingly, the content of the DLS 17 indicates "29". When this value "29" is divided with a (÷3) divider 18, a value of "9" is obtained at a output 19 as the resultant quotient. This output is entered into a (×3) multiplier 20, and a value of:

[DLS/3]×3

([A]: Gaussian symbol, signifying a value of maximum integer which is not greater than A)

is transmitted to a shift circuit 22 as an output 21 indicative of a shift count. In the present example, the output 21 indicates the value of "27." When output 23 from the multiplying circuit 10 enters the shift circuit 22, it is shifted towards lower digits with sign augmentation by the value "27" of the shift count of the output 21, and a final multiplication result is provided on output line 24.

The output from (÷3) divider 18 is also transmitted to an arithmetic unit ALU 25. Upon command of a function (FUNC) signal 27, the ALU 25 performs a subtraction in which the value of the output from (÷3) divider 18 is subtracted from the value of the output from the recursive control counter RCNT 13 one line 26. The result on line 28 is returned to a selector 29. As a constant, a value of, e.g., "11" is externally entered into the selector 29 through an input line 30. An output 31 from the selector 29 is entered into the recursive control counter RCNT 13. The RCNT 13 has its contents subjected to "minus 1" (subtracted by one) by a count-down signal 32 which is delivered from the multiplying circuit 10 each time one multiplication is completed. The output 26 of the RCNT 13 is entered into the zero detector 14. In consequence, the output 15 which commands the twelve recursive operations of the multiplying circuit 10 and the shifting corresponding to 3 bits as stated previously is delivered.

Referring to FIG. 2, the principle of operation of the multiplication control will be described in detail. The multiplication based on the 3-bit check system of this embodiment is carried out in such a manner that the multiplier $b = b_0 b_1 \ldots b_n$ is separated every 3 bits from the most significant digit. The multiples of the MCD given in Table 1 are determined by the 4 bits in the respective parentheses of Eq. (1), that is, the 4 bits consisting of the 3 bits ($b_{3i}, b_{3i+1}, b_{3i+2}$) and the subsequent $b_{3i+3}$. There are $2^4$ or 16 values which are represented by the 4 bits ($b_{3i}$ through $b_{3i+3}$). Among them, the values whose leading bits $b_{3i}$ are "0" number 8, and the values whose leading bits $b_{3i}$ are "1" number 8. The remaining 3 bits ($b_{3i+1}$ through $b_{3i+3}$) are arranged as regards the cases where the leading bits are "0" and "1" respectively, in the following Table 2:

Table 2

| | | | $b_{3i}$ | |
|---|---|---|---|---|
| $b_{3i+1}$ | $b_{3i+2}$ | $b_{3i+3}$ | 0 | 1 |
| 0 | 0 | 0 | 0 | −4 |
| 0 | 0 | 1 | 1 | −3 |
| 0 | 1 | 0 | 1 | −3 |
| 0 | 1 | 1 | 2 | −2 |
| 1 | 0 | 0 | 2 | −2 |
| 1 | 0 | 1 | 3 | −1 |
| 1 | 1 | 0 | 3 | −1 |
| 1 | 1 | 1 | 4 | 0 |

The multiples of the MCD determined by Table 2 are multiplied by the MPR b, and these products are termed partial products PPR's. By sequentially adding the partial products PPR's, the product PRD is obtained.

FIG. 2 serves to explain the operating procedures of the MPR. The multiplying operation of, e.g., "101011" (indicative of "43" in the decimal number) as based on the 3-bit check system is performed as described hereunder.

First of all, the PPR is made zero. By the first operation,

PPR$_0$=0

PPR$_1$=PPR$_0$+(3×MCD)×$2^0$=3×MCD×$2^0$=3×MCD is obtained. In the first operation, the value "3" which corresponds to the second-last value "110" in the column of the leading bit $b_{3i}$=0 in Table 2 is selected for the binary number "0110," and the operation (3×MCD) in the above equation is executed. ($b_{36}$=0) Initial value of RMPR$_{36}$=0.

By the second operations, there is obtained.

$$PPR_2 = PPR_1 + (-3 \times MCD) \times 2^3 = 3 \times MCD + (-3 \times MCD) \times 2^3 = -21 \times MCD$$

Likewise, the value "−3" which corresponds to the third value "010" in the column of $b_{3i}=1$ in Table 2 is selected for the binary number "1010", and the operation ($-21 \times MCD$) in the above equation is executed.

By the third operation, there is obtained:

$$PPR_3 = PPR_2 + (1 \times MCD) \times 2^6 = -21 \times MCD + 64 \times MCD = 43 \times MCD$$

Likewise, the value "+1" which corresponds to the second value "001" in the column of $b_{3i}=0$ in Table 2 is selected for the binary number "0001," and the operation ($43 \times MCD$) in the above equation is executed.

All the fourth to twelfth operations become:

$$PPR = PPR_3 + 0 \times 2^{3i}(i=3 \text{ to } 11) = 43 \times MCD + 0 = 43 \times MCD$$

The prior art multiplication system requires the step of adding "0" in the fourth to twelfth operations in the above operating procedure. In contrast, this embodiment does not execute the fourth to twelfth operations and can enhance the processing speed.

More specifically, as illustrated in FIG. 1, the bit contents of the MPR is checked and the number of consecutive bits having the same value as the "0" bit and immediately following it is detected by means of the leading 0/1 decoder 16. In the example shown in FIG. 2, "0's" continue from bit 0 to bit 29 as described previously. Therefore, the content of the output DLS 17 of the leading 0/1 decoder 16 indicates the value "29." The divider 18 having received this output DLS 17 conducts the operation of 29÷3, and delivers the value "9" to the output 19 as the resultant quotient. On the other hand, the constant input value "11" is introduced into the RCNT 13 through the selector 29 as the recursive control constant in advance, and it is further introduced into the ALU 25. The ALU 25 conducts the operation of 11−9=2 on the basis of the FUNCT signal 27, and the resulting value "2" is set in the RCNT 13 via the output line 28 and the selector 29. This value of the RCNT 13 is counted down by the signal 32, and is detected by the zero detector 14. Here, the number of times of the recursive operations of the set value "2" becomes "3" (2, 1, 0), and the recursive operation command is transmitted from the output 15 to the multiplying circuit 10. In the multiplying circuit 10, the first to third operations are executed by a procedure to be described below.

The results produced by the multiplying circuit 10 is set in the shift circuit 22, and the shifting is executed. In this shifting, the value "9" of the output 19 of the divider 18 is entered into the (×3) multiplier 20, the operation of 9×3=27 is performed in the multiplier 20, and the shift value "27" is given to the shift circuit 22 by the output 21. In the circuit 22, the partial product PPR produced through the third operation as obtained from the output 23 is shifted towards lower digits sign augmentation by 27 bits as if the fourth to twelfth operations had been executed. The value of the final product of this result is obtained from output 24.

Figure 3:
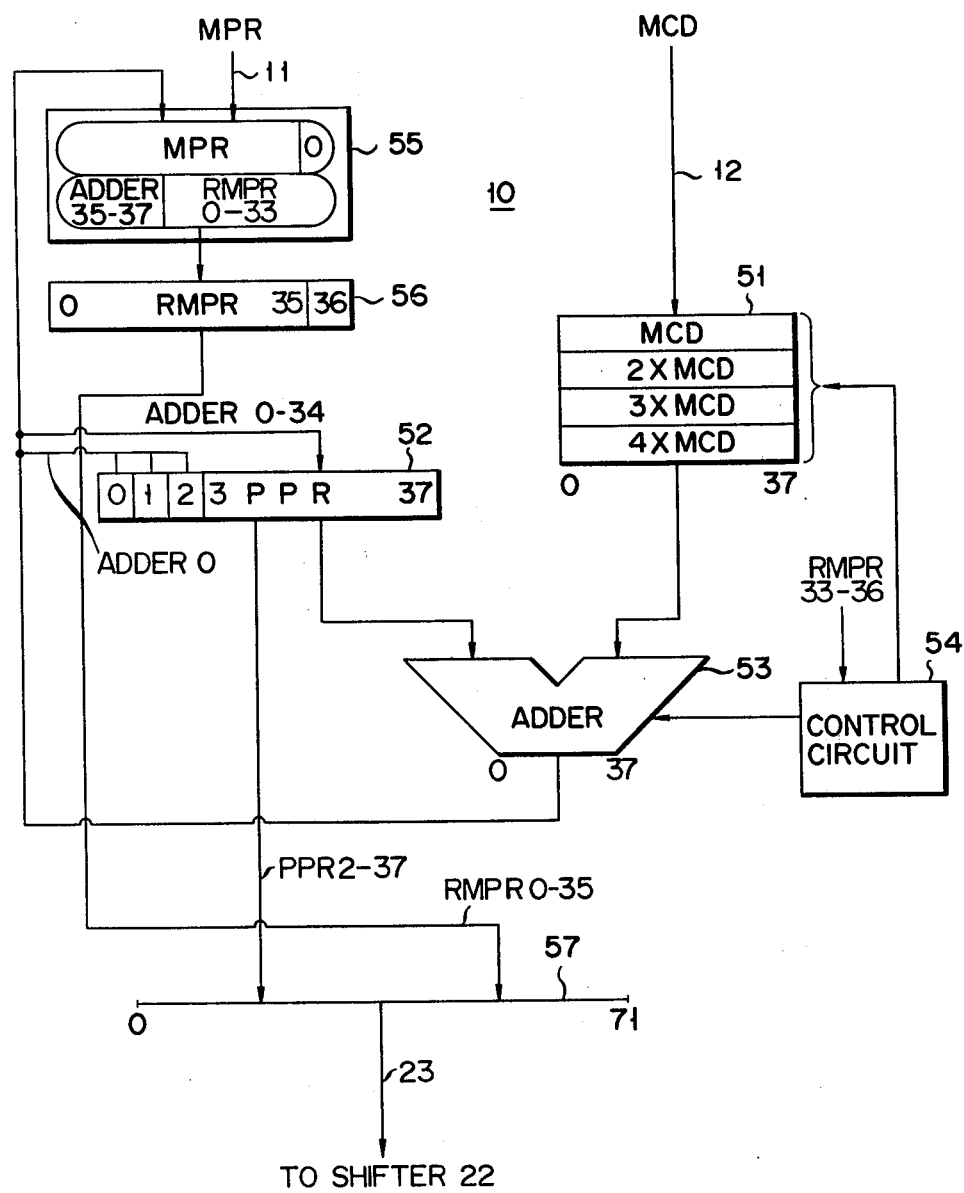
FIG. 3 is a block circuit diagram showing the details of the multiplying circuit 10 in FIG. 1.

Referring now to FIGS. 3 and 4, the construction and the operation of the multiplying circuit 10 shown in FIG. 1 will be described.

FIG. 3 is a block diagram showing an embodiment of the multiplying circuit 10. The multiplying circuit illustrated in the figure is constructed of a register 51 which stores MCD, 2×MCD, 3×MCD and 4×MCD prepared from the multiplicand MCD; a register 52 which calculates the partial product PPR; an adder circuit 53 which executes addition or subtraction between the value of the partial product PPR generated by register 52 and the multiple value of the MCD selected from the register 51 or which transmits the value of the partial product PPR as it is (i.e., which executes the "0" addition); a control circuit 54 which designates the address for selecting the multiple value of the MCD in register 51 and controls the operation of addition, subtraction or "0" addition in adder circuit 53; a selector 55; a register 56 which receives data from the selector 55; and a bus 57 which delivers a product PRD' formed in the register 56 and the register 52 in a multiplying operation (this product is data which has not yet been subjected to the shifting processing in the shift circuit 22 shown in FIG. 1).

In the multiplying circuit 10, the multiple values of the multiplicand MCD to be stored in the register 51, i.e., 1×MDC, 2×MCD, 3×MCD and 4×MCD are obtained as follows. 2×MCD is calculated by adding the MCD to 1×MCD, 3×MCD is determined by adding the MCD to 2×MCD, and 4×MCD is calculated by adding the MCD to 3×MCD. However, the respective multiples of the MCD may be formed in any manner desired. As apparent from the above, the bit length of the register 51 should be at least 2 bits greater than the multiplicand MCD. In FIG. 3, therefore, the register 51 has a bit length of 38 bits with sign augmentation if necessary (bit 0 to bit 37) to accommodate the 36 bit MCD considered in the present embodiment.

The selector 55 selects the multiplier MPR bit 0 to bit 36 (MPR bit 36 initial value is "0" in the example shown) externally supplied, or data obtained in such a way that the multiplier MPR is shifted rightwards by 3 bits each time a multiplication is executed and that the lower 3 bits (bit 35 to bit 37) of the adder circuit 53 are transmitted to the higher 3 bits having been emptied by the right shifting, each time of multiplication. The selector 55 supplies the selected MPR data of the register RMPR 56.

Further, an initial value of "0" is set into the register 52 for the partial product PPR. The produced by the adder circuit 53, i.e., the data at bits 0 to 34 is transmitted to the bit 3 to bit 37 positions of register 52 in order to be used as the partial product PPR in the subsequent operation. In that part of the register 52 which has become empty owing to the transmitting operation, each bit 0–2 of PPR register 52 is set equal to the value of bit 0 of the adder circuit 53 for the sign augmentation. When the multiplying circuit has completed the operations of the number of times of multiplication already explained, the 72 bits of data formed by concatenating bits 2-37 from PPR registers 52 with bits 0-35 from the MPR register 56 are transmitted from the output bus 57 to the shift circuit 22 in FIG. 1 in order to form the result to be product determined.

A specific example of operation of the above multiplying circuit will now be described. The explanation will be made of an actual multiplication employing concrete numerical values. To this end, the operation for a multiplier MPR having a decimal value of 43 will be referred to, and the multiplicand MCD will be assumed to have a value of 8.

(Example)

Multiplier MPR=43 (decimal notation) =00 . . .
0000101011 (36 bits, binary notation, partially omitted)

RMPR=00 . . . 00001010110 (RMPR bit 36=0 initially 37 bits, binary notation, partially omitted)

Multiplicand MCD=8 (decimal notation)=00 . . .
0000001000 (36 bits, binary notation, partially omitted)

At this time, the product PRD=344 (decimal notation) =00 . . .
0101011000 (72 bits, binary notation, partially omitted)

is to be obtained.

The left-digit in each binary number is the sign bit. In each case this bit is 0 because MPR, MCD are both positive.

In this case, the respective multiple values of the multiplicand MCD to be entered in the register 51 in FIG. 3 are given in Table 3:

Table 3

|  | 0           37 |
|---|---|
| 1 × MCD | 0 . . . . . 0001000 |
| 2 × MCD | 0 . . . . . 0010000 |
| 3 × MCD | 0 . . . . . 0011000 |
| 4 × MCD | 0 . . . . . 0100000 |

Here, let's confirm again the multiplication at the time when the multiplier MPR=43. It is confirmed that this multiplication can obtain the product by the three operations in all.

The first operation is: (PPR$_0$=0 by initially set)

$$PPR_1 = PPR_0 + (3 \times MCD) \times 2^0$$

Thus, the addition between the initial value of the register 52 and the and the value of 3×MCD of the register 51 is executed by the adder circuit 53. At this time, the control circuit 54 addresses 3×MCD of the register 51 because RMPR register 56 bit 33-36 is "0110" and controls the adder circuit 53 so as to carry out the 0 addition.

Accordingly,

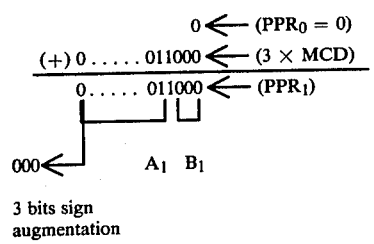

is executed in the adder circuit 53. Thus, 3×MCD=PPR$_1$ is obtained. The result A$_1$ and 3 bit sign augmentation is the partial product of the next operation and is set in the register 52. On the other hand, the result B$_1$ forms part of the product, and the product of the last 3 bits which are not changed is obtained at once in the operation of the 3-bit check system adopted in the foregoing. The value of B$_1$ is set in the register 56 through the selector 55. The state of the register 56 at this time becomes:

0000 . . . . . 000001010    (37 bits, binary notation, partially omitted)
data    MPR shifted rightwards by 3 bits
of B$_1$ The second operation is:

$$PPR_2 = PPR_1 + (-3 \times MCD) \times 2^3$$

This signifies that $-3 \times MCD \times 2^3 = -24MCD$ is added to $3 \times MCD$ determined in the first operation. At this time, accordingly, the control circuit 54 addresses $-3 \times MCD$ of the register 51 because RMPR register 56 bit 33-36 is "1010" and controls the adder circuit 53 so as to execute the subtraction. The second operation is confirmed to be:

$PPR_2 = PPR_1 + (-3 \times MCD) \times 2^3$ (which can be substituted by)

output of adder circuit
$53 = [PPR_1/2^3] + (-3 \times MCD)$

[A]: Gaussian symbol

Let's confirm the value of the register 52 after the first operation. In the register 52, the data at the bit 0-34 of the adder circuit 53 (i.e., the result A$_1$ and 3 bits sign augmentation of the first operation) is set. This signifies that the partial product PPR$_1$ obtained by the first operation is shifted rightwwards by 3 bits and is set.

$$PPR = [PPR_1/2^3]$$

Accordingly, the second operation simply subtracts the value of 3×MCD of the register 51 from the value of the register 52, whereby the partial product PPR$_2$ is obtained. This operation is indicated as follows:

```
        0 . . . . . 000011    [PPR₁/2³]
    (-) 0 . . . . . 011000    -3 × MCD

=   0 . . . . . 000011
    (+) 1 . . . . . 101000    (adding the 2's comple-
        1 . . . . . 101011    ment of 3 × MCD)

111        A₂    B₂
        3 bits sign
        augmentation
```

$3 \times MCD - 24MCD = -21 \times MCD = PPR_2$ is obtained from the adder circuit 53. As in the first operation, the result A$_2$ and 3 bits sign augmentation is the partial product of the next operation and is set in the register 52. Similarly, the result B$_2$ forms part of the product, and this product of 3 bits is set in the register 56 through the selector 55. The state of the register 56 at this time becomes:

0110000 . . . . . 0001    (37 bits, binary notation, partially omitted)
B$_2$ B$_1$    MPR further shifted rightwards by 3 bits
part of product The third operation is:

$$PPR_3 = PPR_2 + (1 \times MCD) \times 2^6$$

This operation signifies that $(1 \times MCD) \times 2^6 = 64$ MCD is added to the partial product $-21$ MCD obtained in the second operation. The control circuit 54 at this time accordingly addresses $1 \times MCD$ of the register 51 and controls the adder circuit 53 so as to execute the addition. As in the second operation, the third operation can be substituted by:

output of adder circuit $53 = [PPR_2/2^6] + (1 \times MCD)$

As to the partial product $PPR_1$ being the result of the first operation, the data having been shifted rightwards by 3 bits $[PPR_1/2^3]$ is set in the register 52. As to the partial product $PPR_2$ being the result of the second operation having employed this data of the register 52, the data having been shifted rightwards by 3 bits is set in the register 52. Therefore, the data of $[PPR_2/2^6]$ is set in the register 52.

Accordingly, also the third operation simply adds the data of the register 52 and the data of $1 \times MCD$ from the register 51, whereby the partial product $PPR_3$ can be obtained. This operation is indicated as follows:

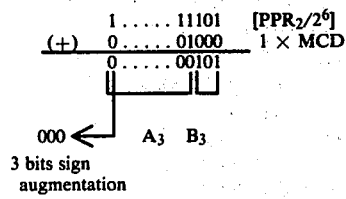

$-21 \times MCD + 64 \times MCD = 43 \times MCD = PPR_3$ is obtained from the adder circuit 53. The data $A_3$ and 3 bits sign augmentation of the operated result is set in the register 52, and the data $B_3$ is set in the register 56 through the selector 55.

The multiplication of the example is completed by the above three operations. The data set in the register 52 and the register 56 form the product, as is confirmed by the following:

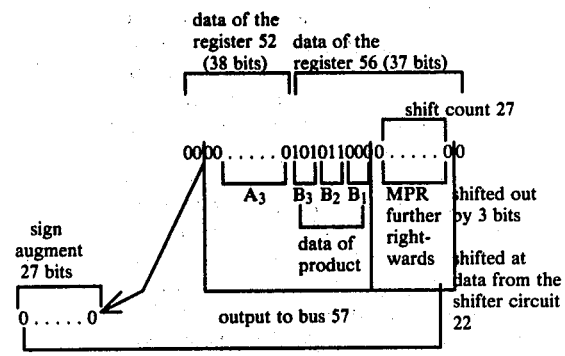

The data of the products $B_3$, $B_2$ and $B_1$ formed every 3 bits by the three operations form "101011000" = (344), which is transmitted through the bus 57 to the shift circuit 22 in FIG. 1. The shift circuit 22 contains a right shift count of "27" from the ($\times 3$) multiplier 20 shown in FIG. 1. Accordingly, the data of the register 52 and the register 56 are shifted rightwards by 27 bits. Then, they become:

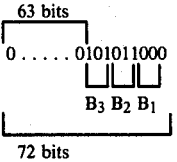

All the operations in the multiplication control illustrated in FIG. 1 are completed, and the result of the shifting, "0 ... 0101011000" = (344) is delivered as the output.

The flow chart of the above multiplication control will be described with reference to FIG. 4. In initial step $S_1$, a "0" is set into PPR register 52 and counter RCNT 13 is set to an initial value of "11." In step $S_2$, the number of those digits of the multiplier MPR which need not be operated on is detected by the leading 0/1 decoder 16, and the output DLS is obtained. The multiplier MPR is set into the register 56. The number of recursive operations of the multiplying circuit 10 with [DLS/3] subtracted from counter RCNT 13 is determined and is set in the counter RCNT 13, and therewith, the right shift count of the product $[DLS/3] \times 3 \to RSC$ is obtained. At steps $S_3$, $S_4$, $S_5$ and $S_6$, the respective multiples of the multiplicand MCD are calculated and set in the register 51. At steps $S_7$, the operations described with reference to FIG. 3 are executed with the operation number (loop count $12 - [DLS/3]$) controlled by the RCNT 13. The partial product PPR obtained every operation is shifted rightwards by 3 bits, and is transmitted to the register PPR 52 and the register RMPR 56. In step $S_8$, the result obtained at $S_7$ is shifted by the right shift count RSC and is then delivered at the output. An indicator is set according to the result obtained at $S_8$ and the procedure terminates.

Although the MPR was assumed to have a positive value in the above embodiment, the system of the invention operates similarly in the case where it has a negative value. It is necessary to take care in the case of an overflow from the adder circuit 53 (only the case $(-2^\pm) \times (-2^{35}) = 2^{70}$) that PPR register 52 bits 0–2 must be set to a special value representing the complement of bit 0 of the adder circuit 53. Although in the above described embodiment the number of significant digits of the MPR was detected by the leading 0/1 decoder, the system can also operate by detecting the significant digits of the MCD. This invention can be applied, not only to operations involving fixed point numbers, but also to multiplications of floating point numbers. Also in the case of floating point operation, most of the numbers are normalized, and hence, the lower order bits are often "0." Accordingly, how many bits are "0" as reckoned from the lowest bit is detected by the use of a trailing 0 decoder 60 as shown in FIG. 5, and the bits of the MPR or MCD are shifted in correspondence with the number of times of adding "0" likewise to the foregoing, whereby the average processing speed can be enhanced as in the previous embodiment. The number-of-digits detection output of the trailing 0 decoder 60 may be processed alike as the leading 0/1 decoder.

What is claimed is:

1. A multiplication control system comprising a recursive multiplying circuit to which a binary-coded multiplier and a binary-coded multiplicand are supplied, a detection portion which detects the number of continuous "0" or "1" bits adjacent the most or least significant digit to detect the number of those significant digits in said multiplier which need to be operated, means to determine the number of recursive operations required of said multiplying circuit in correspondence with the detected number of said digits, and means to execute said recursive operations in accordance with said determined number of said operations.

2. A multiplication control system according to claim 1, wherein said multiplying circuit comprises a register which stores multiple values of said multiplicand therein, a register in which partial products are set, an adder which executes one of predetermined additions on the basis of the predetermined multiple value of said multiplicand and the value of the partial product, a control circuit which designates an address for selecting said predetermined multiple value in the multiple storing register and the adding operation of said adder, a selector, a register in which data from said selector is set, and a bus which delivers the contents of the partial product register and the selector data register.

3. A multiplication control system according to claim 1, wherein the number-of-digits detecting portion comprises a leading 0/1 decoder which detects leading 0/1 of binary bits constituting said multiplier, a divider which divides the number of the digits detected by said decoder by a predetermined integer, and an arithmetic unit for obtaining a difference between the number of all the digits to be operated and the divider output.

4. A multiplication control system according to claim 1, wherein the number-of-digits detecting portion comprises a decoder which detects trailing 0 of binary bits constituting said multiplier, and means to supply the decoder output to the operation executing means.

5. A multiplication control system according to claim 1, wherein said means to determine the number of recursive operations comprises a selector into which an external constant is entered, a recursive control counter into which an output of said selector is entered, a divider which divides the detected number of the digits by a predetermined integer, an arithmetic unit for obtaining a difference between the divider output and an output of said recursive control counter, and means to enter the output of said arithmetic unit into said selector.

6. A multiplication control system according to claim 5, wherein the operation executing means comprises a zero detector which provides an output when the content of said recursive control counter is zero, means to supply said output of said zero detector to said multiplying circuit as a recursive operation and shifting command, a shifter in which an operation result of said multiplying circuit is set, and a multiplier of predetermined number which multiplies the output of said divider by the predetermined number and bestows the multiplied output on said shifter as a shifting command.

7. A multiplication control system comprising a multiplying circuit to which a binary-coded multiplier and a binary-coded multiplicand are supplied, a detection portion which detects the number of those significant digits in said multiplicand which need to be operated, means to determine the number of recursive operations in correspondence with the detected number of the digits, and means to execute the operations by the determined number of said operations.

8. A multiplication control system for generating a binary product output from binary multiplier and binary multiplicand inputs comprising, in combination:
a recursively operating multiplying circuit including a multiplicand register for storing said binary multiplicand and a plurality of multiples thereof, a partial product register, an adder for adding an operand selected from said multiplicand register to an output from said partial product register, means for altering the contents of said partial product register in accordance with the output of said adder, control means for selecting operands from said multiplicand register and for repetitively cycling the operation of said adder, and output means for accumulating product data based on the outputs of said adder;
a detection circuit for detecting the number of significant digits in said binary multiplier and for generating a control signal indicative thereof;
cycling means responsive to said control signal for controlling the repetitive cycling of said adder in accordance with the number of said significant digits; and
shifting means also responsive to said control signal for shifting the product data accumulated in said output means by a number of digits dependent on said number of significant digits detected in said multiplier to provide said binary product output.

9. The multiplication control system according to claim 8 wherein said cycling means comprises a selector into which an external constant is entered, a recursive control counter into which the output of said selector is entered, an arithmetic unit for obtaining the difference between the quantity represented by said control signal and the output of said recursive control counter, and means to enter the output of said arithmetic unit into said selector.

10. The multiplication control system according to claim 9 wherein said cycling means further comprises a zero detector which provides an output when the contents of said recursive control counter are zero, and means for supplying said zero detector output to said multiplying circuit to terminate the cycling of said adder and to said shifting means as a shifting command.

11. The multiplication control system according to claim 8 wherein said detection circuit comprises a leading 0/1 decoder which detects the number of consecutive leading 0/1 binary bits in said multiplier, and a divider which divides the number of bits detected by said decoder by a predetermined integer to generate said control signal.

* * * * *